United States Patent
Lee et al.

(10) Patent No.: US 10,414,242 B2
(45) Date of Patent: Sep. 17, 2019

(54) AIR CONDITIONING SYSTEM FOR MOTOR VEHICLES

(71) Applicant: Hanon Systems, Daejeon (KR)

(72) Inventors: Jeong Hoon Lee, Daejeon (KR); Young Gyu Kim, Daejeon (KR); Yeon Seob Kim, Daejeon (KR)

(73) Assignee: Hanon Systems, Daejeon (KR)

( * ) Notice: Subject to any disclaimer, the term of this patent is extended or adjusted under 35 U.S.C. 154(b) by 263 days.

(21) Appl. No.: 15/505,005

(22) PCT Filed: Sep. 22, 2015

(86) PCT No.: PCT/KR2015/009959
§ 371 (c)(1),
(2) Date: Feb. 17, 2017

(87) PCT Pub. No.: WO2016/048012
PCT Pub. Date: Mar. 31, 2016

(65) Prior Publication Data
US 2017/0267062 A1    Sep. 21, 2017

(30) Foreign Application Priority Data

Sep. 24, 2014  (KR) .......................... 10-2014-0127480

(51) Int. Cl.
*B60H 1/00*  (2006.01)
*G06K 9/00*  (2006.01)
(Continued)

(52) U.S. Cl.
CPC ..... *B60H 1/00742* (2013.01); *B60H 1/00792* (2013.01); *G06K 9/00228* (2013.01);
(Continued)

(58) Field of Classification Search
CPC ............ B60H 1/00742; B60H 1/00792; G06K 9/00228; G06K 9/00255; G06K 9/00838;
(Continued)

(56) References Cited

U.S. PATENT DOCUMENTS 5,390,728 A *  2/1995  Ban .................... B60H 1/00742
                                                   165/202
6,550,686 B2   4/2003  Kawai et al.
(Continued)

FOREIGN PATENT DOCUMENTS

JP     2001150920 A    6/2001
JP     2001315519 A    11/2001
(Continued)

OTHER PUBLICATIONS

International Search Report issued in PCT/KR2015/009959 dated Dec. 22, 2015.

*Primary Examiner* — Davis D Hwu
(74) *Attorney, Agent, or Firm* — Norton Rose Fulbright US LLP

(57) ABSTRACT

An air conditioning system for motor vehicles includes a plurality of infrared image sensors configured to take images of a vehicle room to detect infrared rays radiated from vehicle occupants, and an analysis unit configured to analyze vehicle occupant information based on the images taken by the infrared image sensors. The infrared image sensors are installed in front upper regions of the vehicle room so as to take images of different imaging areas.

12 Claims, 5 Drawing Sheets

(51) Int. Cl.
*H04N 5/33* (2006.01)
*G06K 9/20* (2006.01)

(52) U.S. Cl.
CPC ..... *G06K 9/00255* (2013.01); *G06K 9/00838* (2013.01); *G06K 9/00845* (2013.01); *G06K 9/2018* (2013.01); *H04N 5/33* (2013.01); *B60Y 2400/3015* (2013.01)

(58) Field of Classification Search
CPC .... G06K 9/00845; G06K 9/2018; H04N 5/33; B60Y 2400/3015
USPC ........................................................ 165/202
See application file for complete search history.

(56) References Cited

U.S. PATENT DOCUMENTS 7,511,833 B2 * 3/2009 Breed ................. G01F 23/0076
                                                                             180/272
2015/0103141 A1 4/2015 Lee et al.

FOREIGN PATENT DOCUMENTS

| JP | 2005147556 A | 6/2005 |
|---|---|---|
| KR | 20120066394 A | 6/2012 |
| KR | 20140001766 A | 1/2014 |

* cited by examiner

AIR CONDITIONING SYSTEM FOR MOTOR VEHICLES

TECHNICAL FIELD

The present invention relates to an air conditioning system for motor vehicles which is configured to acquire vehicle occupant information through infrared image sensors. More particularly, the present invention pertains to an air conditioning system for motor vehicles which is configured to improve the installation number and installation positions of infrared image sensors and which is capable of increasing a vehicle occupant recognition area and consequently enhancing the acquisition accuracy of vehicle occupant information.

BACKGROUND ART

In order to optimize a vehicle room temperature using an air conditioning system, it is very important to grasp the environmental conditions within a vehicle room. In particular, it is of paramount importance to acquire information on the vehicle occupants existing within a vehicle room. For example, it is quite important to grasp the number of vehicle occupants and the physical characteristics of vehicle occupants.

By doing so, on the basis of the number of vehicle occupants and the physical characteristics of vehicle occupant, it is possible to measure a vehicle room temperature and an amount of carbon dioxide ($CO_2$) generated within a vehicle room. An air conditioning system can be optimally controlled based on the vehicle room temperature and the amount of carbon dioxide thus measured. This makes it possible to keep the vehicle room in a pleasant state.

As a method of acquiring information on the vehicle occupants existing within a vehicle room, there is available a technique that makes use of an infrared image sensor.

According to this technique, as shown in FIG. 1, an infrared image sensor 1 is installed in a front upper region within a vehicle room. The interior of the vehicle room is imaged by the infrared image sensor 1. Infrared rays radiated from the vehicle occupants are detected through the use of the image of the vehicle room. The number, body temperature and body size of the vehicle occupants are grasped by analyzing the distribution ratio and color of the detected infrared rays.

However, the related art has a drawback in that, as shown in FIGS. 1 and 2, the horizontal and vertical imaging widths $\alpha$ and $\beta$ of the infrared image sensor 1 is very narrow. This poses a problem in that the vehicle occupant recognition area ($\alpha \times \beta$) is quite narrow.

Due to the narrow vehicle occupant recognition area ($\alpha \times \beta$), there is a limit in the number of vehicle occupants to be recognized. Furthermore, only a limited part of the body of each of the vehicle occupants can be recognized.

For example, as shown in FIG. 2, it is possible to recognize only a part of the driver sat on a front seat and only a part of a passenger sat on a rear seat. Furthermore, the recognition area is limited to the facial parts of the vehicle occupants.

This significantly reduces the analysis accuracy of information on the vehicle occupants, thereby making it impossible to optimally control an air conditioning system. As a result, the pleasantness of a vehicle room is deteriorated.

SUMMARY OF THE INVENTION

In view of the aforementioned problems inherent in the related art, it is an object of the present invention to provide an air conditioning system for motor vehicles which is configured to improve the installation number and installation positions of infrared image sensors and which is capable of increasing a vehicle occupant recognition area.

Another object of the present invention is to provide an air conditioning system for motor vehicles which is configured to increase a vehicle occupant recognition area and which is capable of recognizing a large number of vehicle occupants as far as possible and acquiring information on many body portions of vehicle occupants as far as possible.

A further object of the present invention is to provide an air conditioning system for motor vehicles which is configured to recognize a large number of vehicle occupants as far as possible and to acquire information on many body portions of vehicle occupants as far as possible and which is capable of increasing the vehicle occupant information acquisition accuracy.

A still further object of the present invention is to provide an air conditioning system for motor vehicles which is configured to increase the vehicle occupant information acquisition accuracy and which is capable of optimally controlling an air conditioning system and consequently improving the pleasantness of a vehicle room.

In order to achieve the above objects, there is provided an air conditioning system for motor vehicles, including: a plurality of infrared image sensors configured to take images of a vehicle room to detect infrared rays radiated from vehicle occupants; and an analysis unit configured to analyze vehicle occupant information based on the images taken by the infrared image sensors, wherein the infrared image sensors are installed in front upper regions of the vehicle room so as to take images of different imaging areas.

Preferably, the infrared image sensors are arranged so that the imaging areas partially overlap with each other.

Preferably, the infrared image sensors includes a first infrared image sensor installed in a driver-seat-side front pillar and a second infrared image sensor installed in a passenger-seat-side front pillar.

Preferably, one of the first and second infrared image sensors is arranged to take an image of a facial portion of a driver-seat-side vehicle occupant existing within the vehicle room, and the other of the first and second infrared image sensors is arranged to take an image of a facial portion of a passenger-seat-side vehicle occupant existing within the vehicle room.

Preferably, the first infrared image sensor is arranged to take the image of the facial portion of the driver-seat-side vehicle occupant existing within the vehicle room, and the second infrared image sensor is arranged to take the image of the facial portion of the passenger-seat-side vehicle occupant existing within the vehicle room.

Preferably, one of the first and second infrared image sensors is arranged to take an image of facial portions of the vehicle occupants existing within the vehicle room, and the other of the first and second infrared image sensors is arranged to take an image of torso portions of the vehicle occupants existing within the vehicle room.

Preferably, the first infrared image sensor is arranged to take the image of the facial portions of the vehicle occupants existing within the vehicle room, and the second infrared image sensor is arranged to take the image of the torso portions of the vehicle occupants existing within the vehicle room.

Preferably, one of the first and second infrared image sensors is tilted at a predetermined angle so as to take an image of a facial portion of a passenger-seat-side vehicle occupant and an image of a torso portion of a driver-seatside vehicle occupant, and the other of the first and second infrared image sensors is tilted at a predetermined angle so as to take an image of a facial portion of the driver-seat-side vehicle occupant and an image of a torso portion of the passenger-seat-side vehicle occupant.

Preferably, the first infrared image sensor is tilted at a predetermined angle so as to take the image of the facial portion of the passenger-seat-side vehicle occupant and the image of the torso portion of the driver-seat-side vehicle occupant, and the second infrared image sensor is tilted at a predetermined angle so as to take the image of the facial portion of the driver-seat-side vehicle occupant and the image of the torso portion of the passenger-seat-side vehicle occupant.

Preferably, the analysis unit is configured to grasp the number of the vehicle occupants and the body temperature and body size of the vehicle occupants by analyzing the ratio and color of infrared ray detection sections of the images taken by the infrared image sensors.

Preferably, the analysis unit is configured to acquire three-dimensional vehicle occupant information by three-dimensionally converting mutually-overlapping sections of the images taken by the infrared image sensors.

Advantageous Effects

According to the present air conditioning system for motor vehicles, the vehicle occupant information is recognized by two infrared image sensors which are configured to recognize different areas. This makes it possible to increase a vehicle occupant recognition area to the utmost limit.

Since the vehicle occupant recognition area can be increased to the utmost limit, it is possible to recognize a large number of vehicle occupants as far as possible and to acquire information on many body portions of vehicle occupants as far as possible.

Since the large number of vehicle occupants can be recognized as far as possible and the information on many body portions of vehicle occupants can be acquired as far as possible, it is possible to increase the vehicle occupant information acquisition accuracy.

Since the vehicle occupant information acquisition accuracy can be increased, it is possible to optimally control an air conditioning system and to improve the pleasantness of a vehicle room.

MODE FOR CARRYING OUT THE INVENTION

A preferred embodiment of an air conditioning system for motor vehicles according to the present invention will now be described in detail with reference to the accompanying drawings.

Prior to describing features of an air conditioning system for motor vehicles according to the present invention, an arrangement for acquiring vehicle occupant information through the use of infrared image sensors will be described with reference to FIGS. 3 and 4.

The arrangement for acquiring vehicle occupant information through the use of infrared image sensors includes infrared image sensors 10 and an analysis unit 20.

The infrared image sensors 10 are configured to detect infrared rays radiated from a human body. The infrared image sensors 10 take vehicle room images and divide the vehicle room images into matrix-type image cells 10a.

The analysis unit 20 calculates a ratio, color and momentum of infrared ray detection image cells among the image cells 10a inputted from the infrared image sensors 10 and analyzes vehicle occupant information based on the ratio, color and momentum of infrared ray detection image cells thus calculated. For example, the analysis unit 20 analyzes the number of vehicle occupants, the skin temperature of vehicle occupants, the body size of vehicle occupants and the motion of vehicle occupants.

The vehicle occupant information analyzed in the analysis unit 20 is inputted to a system control unit 30. Based on the vehicle occupant information, the system control unit 30 calculates a vehicle room temperature and an amount of carbon dioxide ($CO_2$) generated within a vehicle room.

The system control unit 30 controls an air conditioner (not shown), a heater (not shown) and various kinds of doors (not shown) based on the vehicle room temperature and the amount of carbon dioxide, thereby controlling the vehicle room temperature in an optimal condition.

Next, features of the air conditioning system for motor vehicles according to the present invention will be described in detail with reference to FIGS. 3 to 6.

Figure 1:
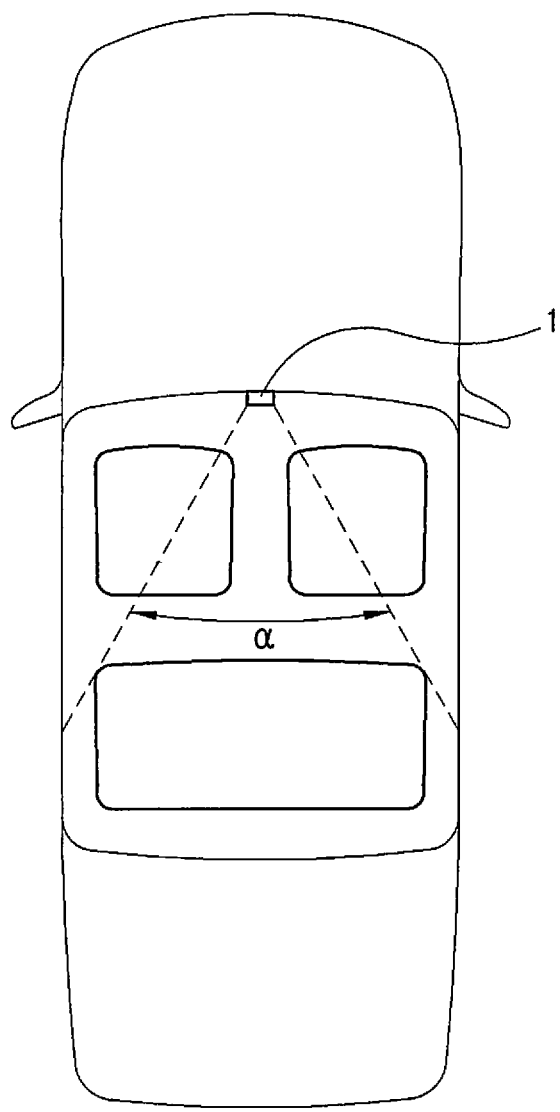
FIG. 1 is a view showing the installation position of an infrared image sensor which takes an image of a vehicle room to acquire vehicle occupant information in an air conditioning system for motor vehicles of the related art.
Figure 2:
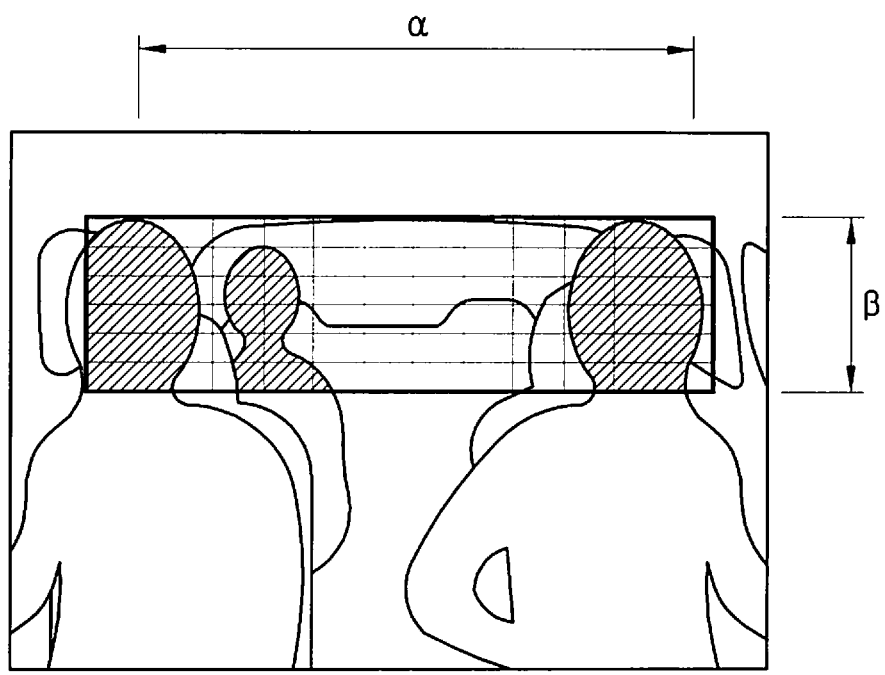
FIG. 2 is a view showing a state in which an image of a vehicle room is taken by an infrared image sensor of the related art.
Figure 3:
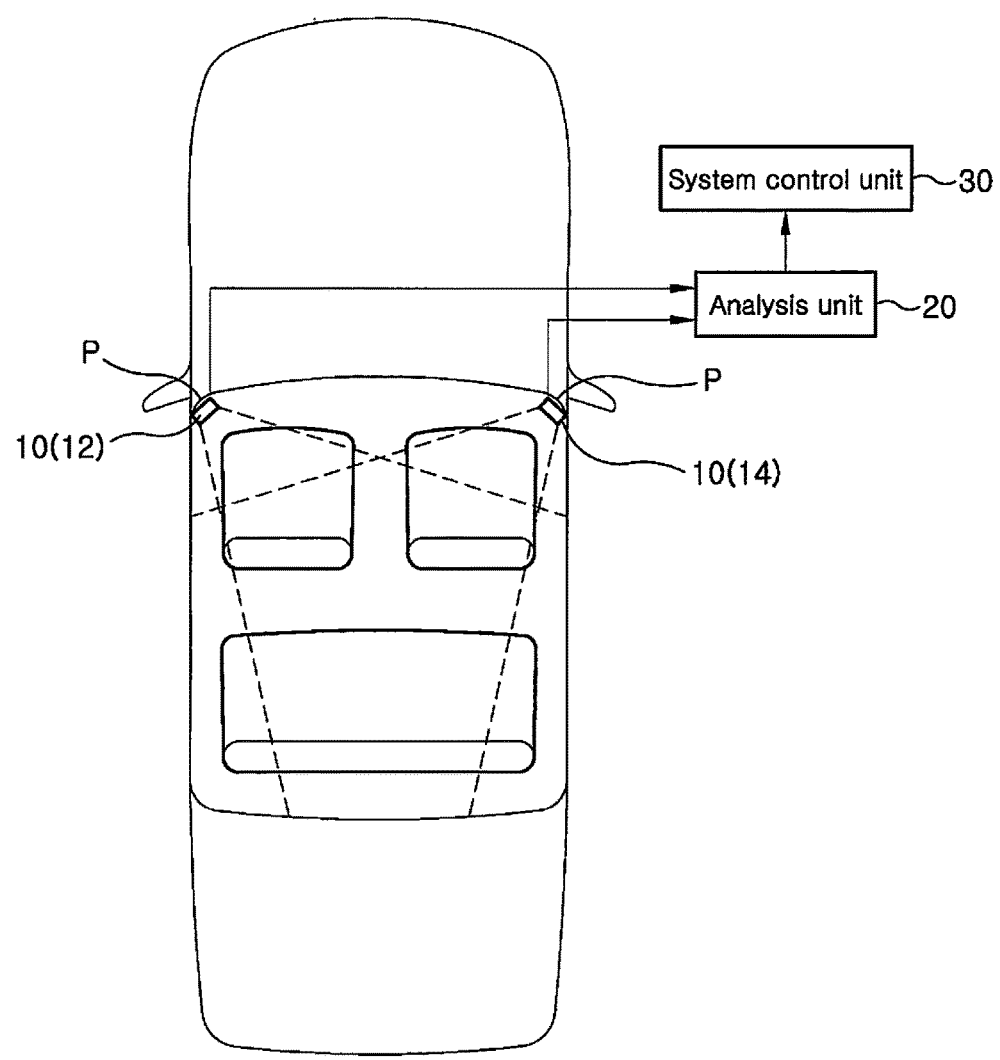
FIG. 3 is a view showing the installation positions of infrared image sensors which take images of a vehicle room to acquire vehicle occupant information in an air conditioning system for motor vehicles according to the present invention.

Referring first to FIG. 3, the air conditioning system for motor vehicles according to the present invention includes infrared a plurality of (e.g., two) image sensors 10 configured to take vehicle room images.

The infrared image sensors 10 are respectively installed in upper portions of left and right front pillars P within the vehicle room.

The infrared image sensors 10 are configured to take vehicle room images from the left and right front pillars P. In the following description, the infrared image sensor 10 installed in the driver-seat-side front pillar P will be referred to as a first infrared image sensor 12, and the infrared image sensor 10 installed in the passenger-seat-side front pillar P will be referred to as a second infrared image sensor 14.

The infrared image sensors 10 are configured to take vehicle room images over different imaging areas.

Figure 4:
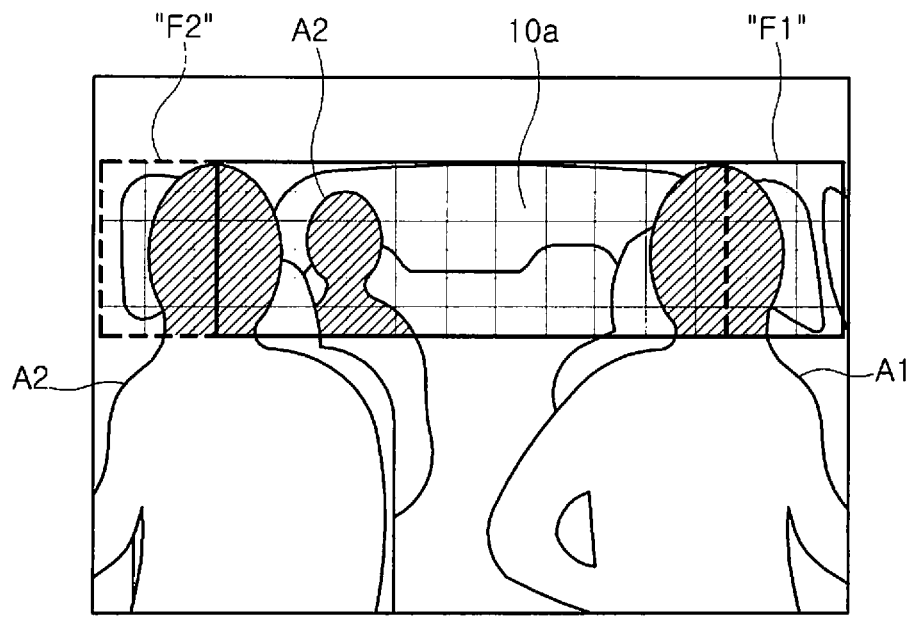
FIG. 4 is a view showing a vehicle room imaging area covered by the infrared image sensors according to the present invention.

For example, as shown in FIGS. 3 and 4, the first infrared image sensor 12 is configured to take a vehicle room image over a facial area F1 of vehicle occupants A1 sitting on driver-side front and rear seats. The second infrared image sensor 14 is configured to take a vehicle room image over a facial area F2 of vehicle occupants A2 sitting on passenger-side front and rear seats.

Thus, the first infrared image sensor 12 is capable of mainly recognizing the vehicle occupants A1 sitting on the driver-side front and rear seats. The second infrared image sensor 14 is capable of mainly recognizing the vehicle occupants A2 sitting on the passenger-side front and rear seats.

More specifically, the first infrared image sensor 12 is capable of mainly recognizing the facial portions of the vehicle occupants A1 sitting on the driver-side front and rear seats. The second infrared image sensor 14 is capable of mainly recognizing facial portions of the vehicle occupants A2 sitting on the passenger-side front and rear seats.

Accordingly, the first and second infrared image sensors 12 and 14 can recognize all the faces of the vehicle occupants A1 and A2 sitting on the driver-side and passenger-side front and rear seats. This makes it possible to increase the number of the vehicle occupants recognized through the first and second infrared image sensors 12 and 14.

As a result, when analyzing the vehicle occupant information using the data obtained by the first and second infrared image sensors 12 and 14, it is possible to significantly increase the information analysis accuracy. Thus, when controlling the air conditioning system based on the vehicle occupant information, it is possible to optimally control the air conditioning system, thereby improving the pleasantness of the vehicle room.

By analyzing the mutually-overlapping sections of the imaging areas covered by the first and second infrared image sensors 12 and 14, it is possible to accurately recognize the faces of the vehicle occupants. In particular, it is possible to three-dimensionally recognize the temperatures and positions of the faces of the vehicle occupants.

This makes it possible to further enhance the vehicle occupant information analysis accuracy and to optimally control the air conditioning system.

In this regard, the analysis unit 20 is provided therein with an infrared correction program which corrects the infrared values of the mutually-overlapping sections of the imaging areas covered by the first and second infrared image sensors 12 and 14 into a single value. Thus, the infrared correction program serves to avoid an error of doubly processing the infrared values of the mutually-overlapping sections.

Furthermore, the analysis unit 20 is provided therein with a stereo-image-matching-type three-dimension conversion program which converts the images of the mutually-overlapping sections of the imaging areas covered by the first and second infrared image sensors 12 and 14 to a three-dimensional image.

The three-dimension conversion program extracts a three-dimensional coordinate by matching the two-dimensional thermal images respectively taken by the first and second infrared image sensors 12 and 14 and obtains a three-dimensional thermal image by finding a three-dimensional matrix through the use of the extracted three-dimensional coordinate. Since the stereo-image-matching-type three-dimension conversion program is well-known in the art, detailed descriptions thereof will be omitted herein.

Figure 5:
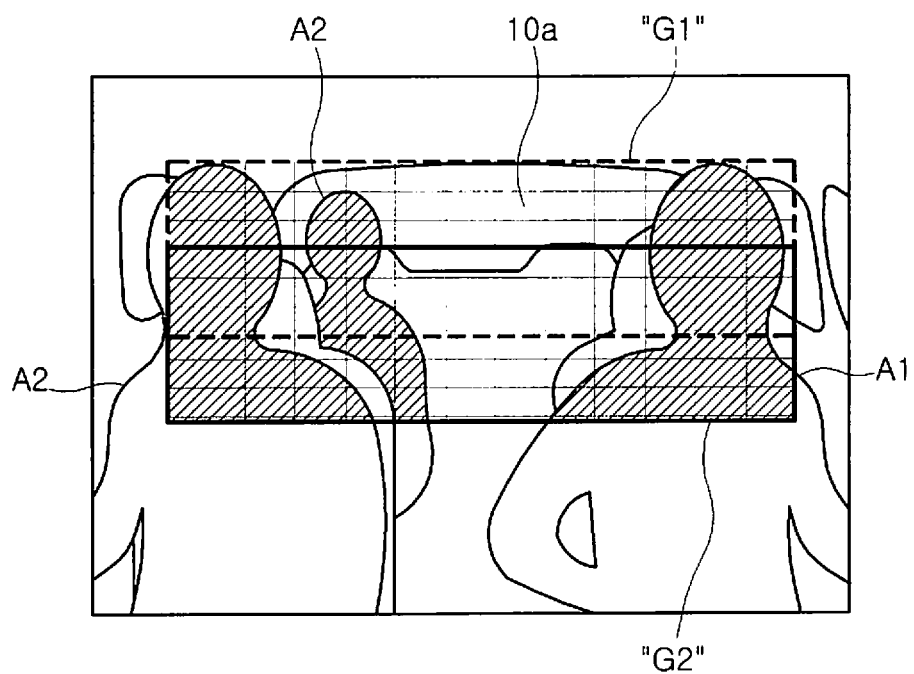
FIG. 5 is a view showing another vehicle room imaging area covered by the infrared image sensors according to the present invention.
Figure 6:
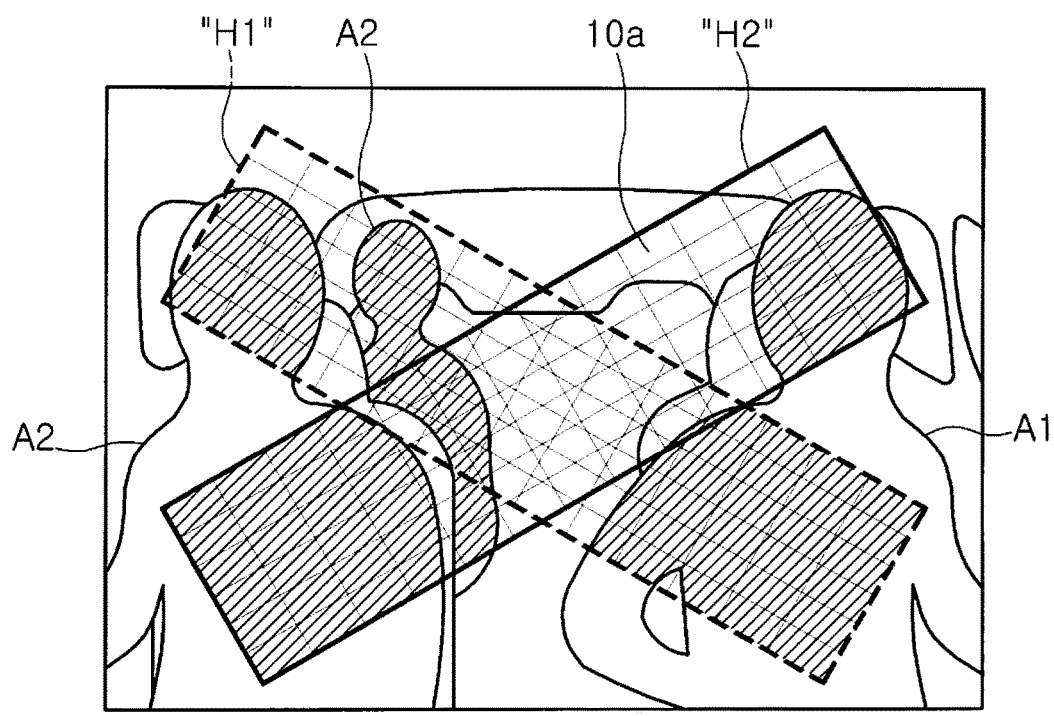
FIG. 6 is a view showing a further vehicle room imaging area covered by the infrared image sensors according to the present invention.

Referring to FIGS. 5 and 6, there are shown other examples of arrangement of the first and second infrared image sensors 12 and 14.

In the example shown in FIG. 5, the first infrared image sensor 12 is arranged to take an image of the facial area G1 of the vehicle occupants A1 and A2 existing within the vehicle room. The second infrared image sensor 14 is arranged to take an image of the torso area G2 of the vehicle occupants A1 and A2 existing within the vehicle room.

More specifically, the first infrared image sensor 12 is arranged to take an image of the facial area G1 of the driver-seat-side and passenger-seat-side vehicle occupants A1 and A2 existing within the vehicle room. The second infrared image sensor 14 is arranged to take an image of the torso area G2 of the driver-seat-side and passenger-seat-side vehicle occupants A1 and A2 existing within the vehicle room.

Accordingly, the first infrared image sensor 12 is capable of recognizing the facial portions of the vehicle occupants A1 and A2. The second infrared image sensor 14 is capable of recognizing the torso portions of the vehicle occupants A1 and A2.

Thus, the first and second infrared image sensors 12 and 14 can acquire information of many body portions of the vehicle occupants A1 and A2.

As a result, when analyzing the vehicle occupant information using the data obtained by the first and second infrared image sensors 12 and 14, it is possible to significantly increase the information analysis accuracy. Thus, it is possible to optimally control the air conditioning system based on the analyzed vehicle occupant information.

It is preferred that the first and second infrared image sensors 12 and 14 are configured to take the images of the facial portions and the torso portions of the vehicle occupants A1 and A2 in a mutually-overlapping manner.

This enables the analysis unit 20 to three-dimensionally recognize the mutually-overlapping sections of the imaging areas covered by the first and second infrared image sensors 12 and 14.

It is therefore possible to three-dimensionally recognize specific body portions of the vehicle occupants and to accurately acquire body information of the vehicle occupants.

In the example shown in FIG. 6, the first and second infrared image sensors 12 and 14 are tilted at a predetermined angle so that the imaging areas are inclined at a predetermined angle.

The first infrared image sensor 12 is tilted at a predetermined angle so as to take an image of the facial portion of the passenger-seat-side vehicle occupant A2 and an image of the torso portion of the driver-seat-side vehicle occupant A1 (as indicated by H1). The second infrared image sensor 14 is tilted at a predetermined angle so as to take an image of the facial portion of the driver-seat-side vehicle occupant A1 and an image of the torso portion of the passenger-seat-side vehicle occupant A2 (as indicated by H2).

That is to say, the first and second infrared image sensors 12 and 14 are tilted at a predetermined angle so as to cross-take an image of the facial portion and the torso portion of the driver-seat-side vehicle occupant A1 and an image of the facial portion and the torso portion of the passenger-seat-side vehicle occupant A2.

Thus, the first and second infrared image sensors 12 and 14 can acquire information of many body portions of the vehicle occupants A1 and A2. When analyzing the vehicle occupant information based on the data obtained by the first and second infrared image sensors 12 and 14, it is possible to significantly increase the information analysis accuracy. This makes it possible to optimally control the air conditioning system based on the analyzed vehicle occupant information.

Even in the example shown in FIG. 6, the analysis unit 20 can three-dimensionally recognize the mutually-overlapping sections of the imaging areas covered by the first and second infrared image sensors 12 and 14. It is therefore possible to accurately acquire information of specific body portions of the vehicle occupants.

According to the present embodiment described above, two infrared image sensors 10 are configured to acquire vehicle occupant information by recognizing different imaging areas. This makes it possible to increase the vehicle occupant recognition area to the utmost limit.

Since the vehicle occupant recognition area can be increased to the utmost limit, it is possible to recognize a large number of vehicle occupants as far as possible and to acquire information on many body portions of vehicle occupants as far as possible.

Since the large number of vehicle occupants can be recognized as far as possible and the information on many body portions of vehicle occupants can be acquired as far as possible, it is possible to increase the vehicle occupant information acquisition accuracy.

Since the vehicle occupant information acquisition accuracy can be increased, it is possible to optimally control an air conditioning system and to improve the pleasantness of a vehicle room.

While some preferred embodiments of the present invention have been described above, the present invention is not limited to these embodiments. It is to be understood that various changes and modifications may be made without departing from the scope of the invention defined in the claims.

What is claimed is:

1. An air conditioning system for motor vehicles, comprising:
    a plurality of infrared image sensors configured to take images of a vehicle room to detect infrared rays radiated from vehicle occupants; and
    an analysis unit configured to analyze vehicle occupant information based on the images taken by the infrared image sensors,
    wherein the infrared image sensors are installed in front upper regions of the vehicle room so as to take images of different imaging areas,
    and wherein the infrared image sensors are arranged so that the imaging areas partially overlap with each other,
    and wherein the analysis unit is configured to grasp the number of the vehicle occupants and the body temperature and body size of the vehicle occupants by analyzing the ratio and color of infrared ray detection sections of the images taken by the infrared image sensors.

2. The air conditioning system of claim 1, wherein the infrared image sensors include a first infrared image sensor installed in a driver-seat-side front pillar and a second infrared image sensor installed in a passenger-seat-side front pillar.

3. The air conditioning system of claim 2, wherein one of the first and second infrared image sensors is arranged to take an image of a facial portion of a driver-seat-side vehicle occupant existing within the vehicle room, and the other of the first and second infrared image sensors is arranged to take an image of a facial portion of a passenger-seat-side vehicle occupant existing within the vehicle room.

4. The air conditioning system of claim 3, wherein the first infrared image sensor is arranged to take the image of the facial portion of the driver-seat-side vehicle occupant existing within the vehicle room, and the second infrared image sensor is arranged to take the image of the facial portion of the passenger-seat-side vehicle occupant existing within the vehicle room.

5. The air conditioning system of claim 2, wherein one of the first and second infrared image sensors is arranged to take an image of facial portions of the vehicle occupants existing within the vehicle room, and the other of the first and second infrared image sensors is arranged to take an image of torso portions of the vehicle occupants existing within the vehicle room.

6. The air conditioning system of claim 5, wherein the first infrared image sensor is arranged to take the image of the facial portions of the vehicle occupants existing within the vehicle room, and the second infrared image sensor is arranged to take the image of the torso portions of the vehicle occupants existing within the vehicle room.

7. The air conditioning system of claim 2, wherein one of the first and second infrared image sensors is tilted at a predetermined angle so as to take an image of a facial portion of a passenger-seat-side vehicle occupant and an image of a torso portion of a driver-seat-side vehicle occupant, and the other of the first and second infrared image sensors is tilted at a predetermined angle so as to take an image of a facial portion of the driver-seat-side vehicle occupant and an image of a torso portion of the passenger-seat-side vehicle occupant.

8. The air conditioning system of claim 7, wherein the first infrared image sensor is tilted at a predetermined angle so as to take the image of the facial portion of the passenger-seat-side vehicle occupant and the image of the torso portion of the driver-seat-side vehicle occupant, and the second infrared image sensor is tilted at a predetermined angle so as to take the image of the facial portion of the driver-seat-side vehicle occupant and the image of the torso portion of the passenger-seat-side vehicle occupant.

9. The air conditioning system of claim 1, wherein the analysis unit is configured to acquire three-dimensional vehicle occupant information by three-dimensionally converting mutually-overlapping sections of the images taken by the infrared image sensors.

10. An air conditioning system for motor vehicles, comprising:
    a plurality of infrared image sensors configured to take images of a vehicle room to detect infrared rays radiated from vehicle occupants; and
    an analysis unit configured to analyze vehicle occupant information based on the images taken by the infrared image sensors,
    wherein the infrared image sensors are installed in front upper regions of the vehicle room so as to take images of different imaging areas,
    and wherein the infrared image sensors are arranged so that the imaging areas partially overlap with each other,
    and wherein the infrared image sensors include a first infrared image sensor installed in a driver-seat-side front pillar and a second infrared image sensor installed in a passenger-seat-side front pillar, and wherein the analysis unit is configured to grasp the number of the vehicle occupants and the body temperature and body size of the vehicle occupants by analyzing the ratio and color of infrared ray detection sections of the images taken by the infrared image sensors.

11. The air conditioning system of claim 10, wherein the analysis unit is configured to acquire three-dimensional vehicle occupant information by three-dimensionally converting mutually-overlapping sections of the images taken by the infrared image sensors.

12. The air conditioning system of claim 3, wherein the analysis unit is configured to acquire three-dimensional vehicle occupant information by three-dimensionally converting mutually-overlapping sections of the images taken by the infrared image sensors.

* * * * *